United States Patent
Collomby

(10) Patent No.: US 6,188,719 B1
(45) Date of Patent: Feb. 13, 2001

(54) RADIOCOMMUNICATION SYSTEM REPEATER

(75) Inventor: Michel Collomby, Saubens (FR)

(73) Assignee: Alcatel Espace, Nanterre (FR)

( * ) Notice: Under 35 U.S.C. 154(b), the term of this patent shall be extended for 0 days.

(21) Appl. No.: 08/931,286

(22) Filed: Sep. 16, 1997

(30) Foreign Application Priority Data

Sep. 17, 1996 (FR) .................................................. 96 11303

(51) Int. Cl.[7] .................................................. H03K 11/00
(52) U.S. Cl. .................................................. 375/211
(58) Field of Search ...................... 340/425.1; 370/274, 370/279, 293, 315, 492, 501; 371/20.2; 379/296; 375/211, 214

(56) References Cited

U.S. PATENT DOCUMENTS

| | | | |
|---|---|---|---|
| 4,704,733 | * 11/1987 | Kawano | 455/16 |
| 4,882,765 | * 11/1989 | Maxwell et al. | 455/18 |
| 5,010,583 | * 4/1991 | Parken | 455/9 |
| 5,113,394 | * 5/1992 | Kotzin | 370/315 |
| 5,200,955 | * 4/1993 | McFarlane et al. | 370/315 |
| 5,233,626 | * 8/1993 | Ames | 375/200 |
| 5,327,580 | * 7/1994 | Vignali et al. | 455/35.1 |
| 5,394,560 | 2/1995 | Kane | 455/12.1 |
| 5,509,028 | * 4/1996 | Marque-Pucheu | 375/211 |
| 5,754,540 | * 5/1998 | Liu et al. | 370/315 |

FOREIGN PATENT DOCUMENTS

| | | |
|---|---|---|
| 0489661A1 | 6/1992 | (EP) . |
| 0501706A2 | 9/1992 | (EP) . |
| 0724339A2 | 7/1996 | (EP) . |
| 2260467 | 4/1993 | (GB) . |
| WO9200636 | 1/1992 | (WO) . |

* cited by examiner

*Primary Examiner*—Don N. Vo
(74) *Attorney, Agent, or Firm*—Sughrue, Mion, Zinn, Macpeak & Seas, PLLC

(57) ABSTRACT

A repeater for use in a radiocommunication network for relaying data communications between first and second stations between which data communication via the radiocommunication network alone is impossible includes a first converter for converting a first radio signal received from the first station into the form of first receive messages and converting first transmit messages into the form of a first radio signal transmitted to a first station. A second converter converts a second radio signal received from said second station into the form of second receive messages and second transmit messages into the form of a second radio signal transmitted to the second station. An application controller manages the first receive messages and the first transmit messages and the second receive messages and the second transmit messages.

6 Claims, 3 Drawing Sheets

RADIOCOMMUNICATION SYSTEM REPEATER

BACKGROUND OF THE INVENTION

1. Field of the Invention

The present invention concerns a radiocommunication system, typically with mobile terminals. The radiocommunication system is a satellite or terrestrial radiocommunication network, for example. To be more precise, the invention concerns a repeater adapted to provide coverage of a geographical area that is inaccessible via the radiocommunication network alone.

2. Description of the Prior Art

Global systems for mobile communications using satellites as repeaters are constantly expanding and their applications cover many fields. Initially limited to maritime applications, these systems now cover terrestrial applications. For example, tracking and paging systems are used for terrestrial transportation. New systems under development are directed to applications including the automatic tracking of cargoes or fleets (trucks, containers, rental automobiles, etc), industrial telecontrol (energy, sensors, irrigation, etc), security of goods and persons (intruder detection, rescue, tracking of materials at risk, fire alarms, floods, etc). These systems use satellites in geostationary, intermediate or low Earth orbit that relay the connections between first stations, such as connection stations, and second stations, such as mobile terminals or beacons.

In these systems, communication between a first station and a second station, for example via a satellite in a satellite network, is no longer assured if the link balance does not yield a sufficient positive margin, typically in the case of attenuation of signals due to the environment (vegetation, inclement weather, buildings, etc) or in the event of damage to the antenna (pulled off, short-circuited, etc). Loss of service occurs more or less frequently, depending on the frequencies chosen and the margins adopted in designing the system. Loss of service is typically permanent if the second station is enclosed in an underground place, such as a carpark, or a metal structure, such as the hull of a ship. It can be temporary, depending on the path followed by the second station, typically in accordance with the nature of the vegetation, the presence of obstacles such as tunnels or buildings, or in the event of non-permanent or non-total failure of the satellite repeaters.

Applications necessitating permanent tracking can be guaranteed only outside so-called "shadow areas" that are inaccessible via the radiocommunication network alone. The result is a general loss of system performance, as well as a reduced service to users. Many of these systems operate on an "interrogate and wait for response" basis. The absence of a response from a station disturbs overall operation by unnecessarily utilizing precious capacity as a result of call attempt repeats, reports, etc.

To remedy this drawback the prior art provides for the use of a repeater, which can incorporate an amplification function, to assure the coverage of a shadow area. In the GSM (Global System for Mobile communications) for example, repeaters called "boosters" are used to cover streets that are inaccessible via the base transceiver stations of the network. A repeater of this kind has a first antenna adapted to receive from and to transmit to a base transceiver station, an amplifier, and a second antenna directed towards the shadow area to be covered.

The main drawback of this prior art solution is that it does not derive any benefit from the fact that a station belongs to a shadow area, for example in terms of economizing on network capacity. The prior art solution solves the problem of the inaccessibility of a station via the network without using this inaccessibility to advantage.

The invention aims to remedy this drawback by providing a particularly advantageous repeater for radiocommunication networks.

SUMMARY OF THE INVENTION

To this end, a repeater in accordance with the invention for use in a radiocommunication network for relaying data communications between first and second stations between which data communication via the radiocommunication network alone is impossible includes first converter means for converting a first radio signal received from the first station into the form of first receive messages and converting first transmit messages into the form of a first radio signal transmitted to the first station, second converter means for converting a second radio signal received from the second station into the form of second receive messages and converting second transmit messages into the form of a second radio signal transmitted to the second station, and application controller means for managing the first receive messages and the first transmit messages and the second receive messages and the second transmit messages.

These application con-roller means thus assure real application-oriented control in the system concerned, not just amplification or possibly message error correction.

Thus the application controller means simulate the first station, respectively the second station, vis à vis the second station, respectively the first station.

The application controller means advantageously include means for storing in memory identification data received from at least one of the first and second stations for addressing the first station, respectively the second station.

The application controller means can include means for producing an interrogation message that is converted by the second converter means into the form of the second radio signal transmitted to the second station.

In one embodiment the application controller means include means for selecting certain second response messages from second response messages received from the second converter means in response to the transmission in the form of the second radio signal of respective interrogation messages and means for producing the certain selected second response messages in first messages transmitted in the form of the first radio signal to the first station.

The application controller means also include means for producing acknowledgement messages to be transmitted that are converted by the first converter means into the form of the first radio signal transmitted to the first station.

If the radiocommunication network is a satellite network, the application controller means include means for delaying the transmission to the first station via the first converter means of messages received from the second station via the second converter means in accordance with an orbital position of a satellite.

Other features and advantages of the present invention will emerge more clearly from a reading of the following description with reference to the corresponding accompanying drawings.

DETAILED DESCRIPTION OF THE PREFERRED EMBODIMENT

Figure 1:
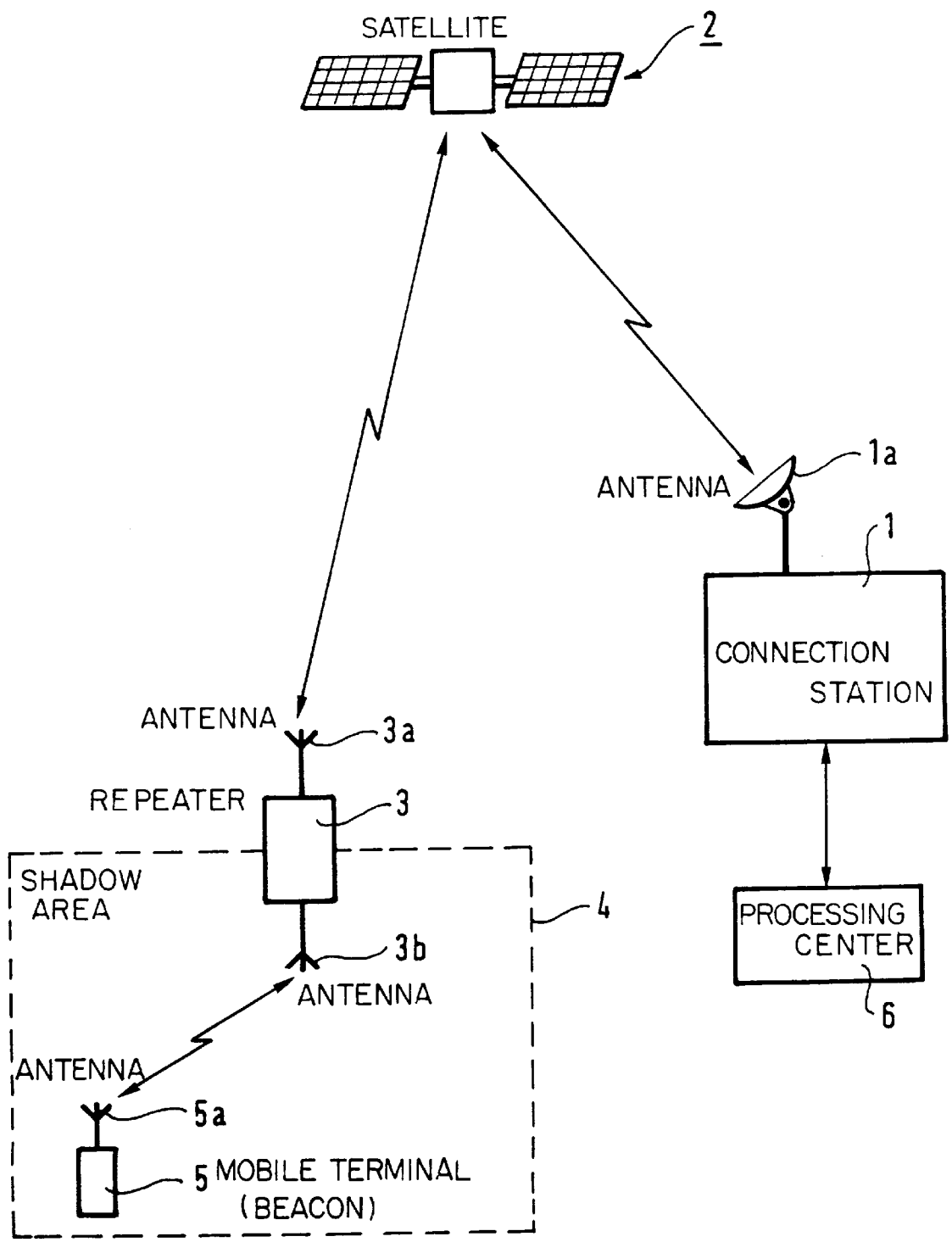
FIG. 1 is a schematic representation of a radiocommunication network using a repeater for coverage of a shadow area inaccessible via said network.

Referring to FIG. 1, in an embodiment described by way of example, a radiocommunication network for using a repeater of the invention includes (a)—at least one connection station 1, called the first station, to which processing centers 6 are connected, (b)—at least one mobile terminal or beacon 5, called the second station, and (c)—at least one satellite 2 via which communications are established between the connection station and the beacon 5. The beacon 5 is assumed to be located in a shadow area 4 that prevents any direct link between it and the satellite 2. The repeater 3 of the invention is typically located at the boundary of the shadow area 4. It has a first antenna 3a adapted to transmit to and to receive from the satellite 2 and a second antenna 3b adapted to transmit to and to receive from the beacon 5 located in the shadow area 4.

Figure 3:
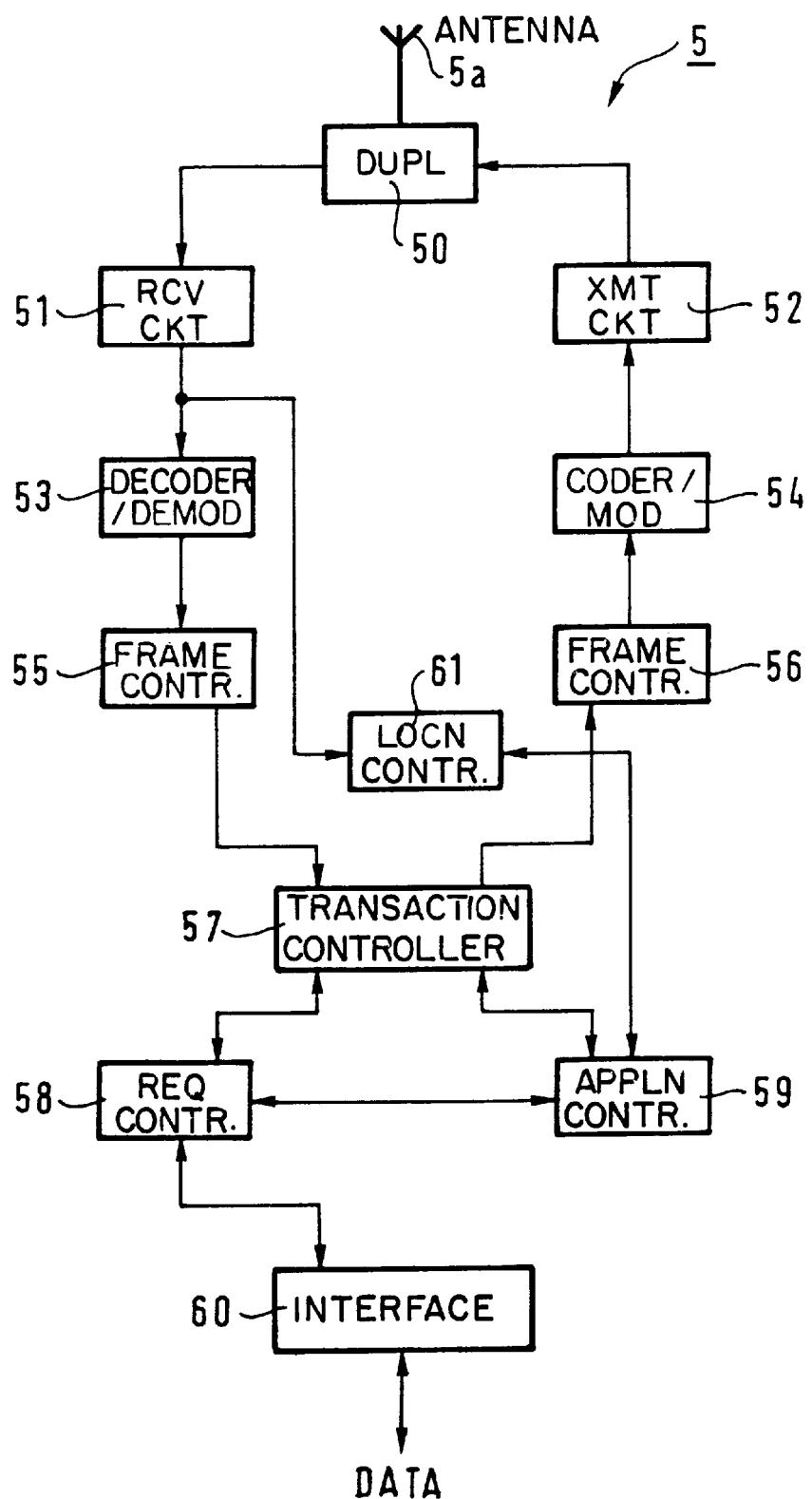
FIG. 3 is a block diagram of a second station located in a shadow area.

As shown in FIG. 3, the beacon 5 typically comprises (a)—in the receive subsystem, a receive circuit 51, a decoder and demodulator circuit 53, a frame controller circuit 55, (b)—in the transmit subsystem, a frame controller circuit 56, a coder and modulator circuit 54 and a transmit circuit 52, and (c)—a duplexer 50, a protocol and transaction controller circuit 57, a request controller circuit 58, an application controller circuit 59, an interface circuit 60 and a location controller circuit 61. This location controller circuit 61 can determine the location of the beacon either from radio signals specific to the system or using a GPS receiver.

The following description assumes that the standard operation of the beacon 5 outside a shadow area 4 is as follows. The beacon 5 periodically transmits to the connection station 1 messages including information such as time information, information on the geographical location of the beacon, information on events detected by sensors, for example, and so on. The skilled person will understand that in a different mode of operation the beacon 5 could transmit such messages to the connection station 1 in response to interrogation messages received from the connection station 1.

In FIG. 3, information on events detected by sensors, for example, is denoted DATA. The time information is typically supplied by a clock in the application controller circuit 59 and the geographical location information is obtained from a GPS satellite under the control of the application controller circuit 59. The beacon therefore operates as follows. The application controller circuit 59 transmits a request to the request controller circuit 58 for the supply of detected event information. The circuit 58 responds by soliciting the interface circuit 60, which is typically connected to a sensor, to supply it the detected event information, which is then transmitted to the application controller circuit 59. In parallel with this, the application controller circuit 59 solicits the location controller circuit 61, one input of which is connected to one output of the receive circuit 51. The receive circuit 51 typically receives three location signals transmitted by GPS satellites enabling the location controller circuit 61 to determine the location of the beacon 5. This information on the location of the beacon is then transmitted to the application controller circuit 59. As a result of these operations, the latter therefore stores the time information, geographical location information and detected event information in its memory. This information is then transmitted in the form of a message to the protocol and transaction controller circuit 57. This circuit 57 is responsible for processing messages received in accordance with particular protocols, for routing these messages in the form of packets, for correcting errors affecting these packets when they are routed across the network. Error correction is assured by a bidirectional link between the beacon 5 and the connection station 1. These packets are then submitted to the frame controller circuit 56 which converts the packets to the frame format and handles the temporal sequencing of transmission of the packets. These frames are transmitted to the connection station through the coder and modulator circuit 54 and the transmit circuit 52.

Figure 2:
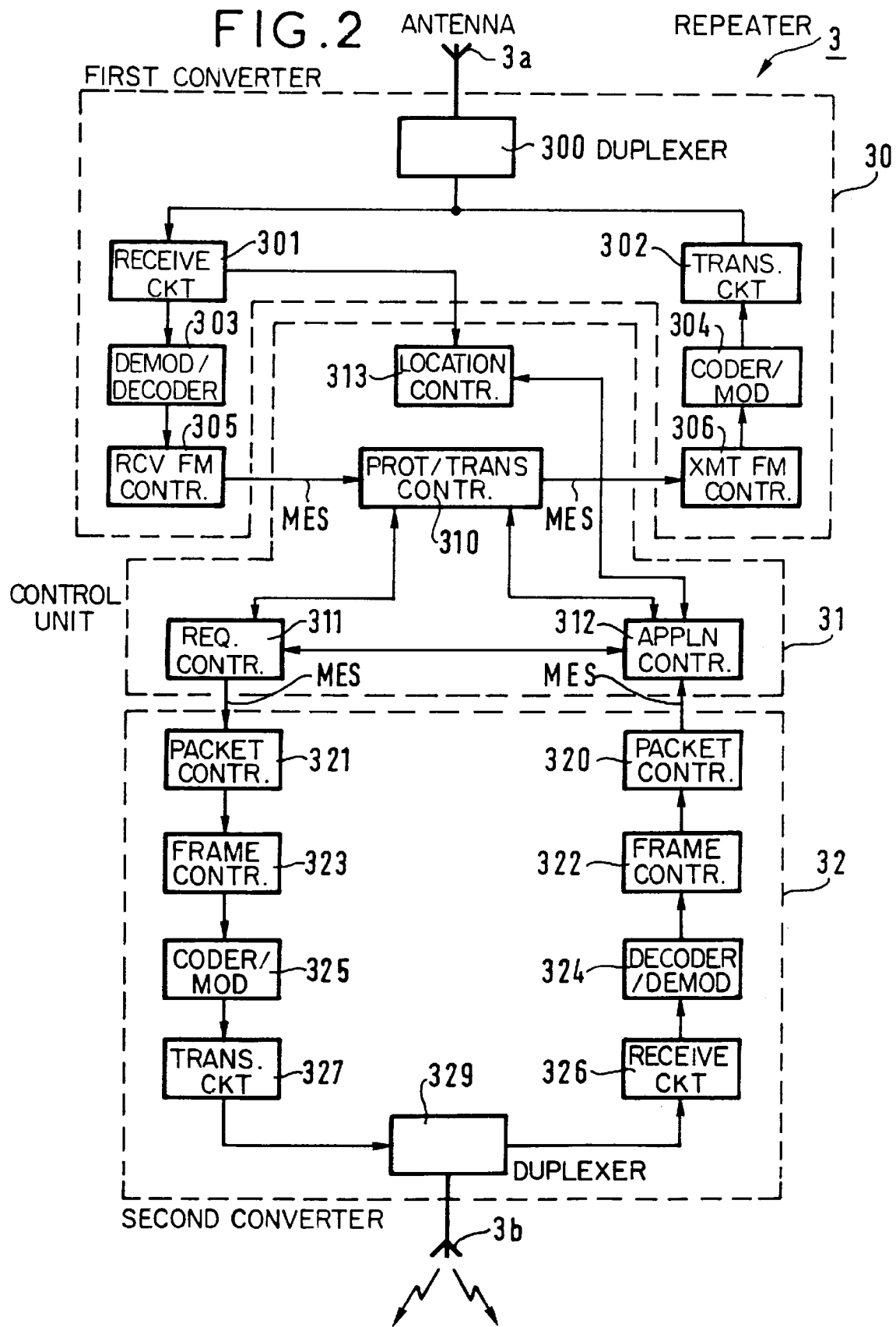
FIG. 2 is a block diagram of a repeater in accordance with the invention.

Referring to FIG. 2, the invention aims to take advantage of the fact that the beacon 5, or second station, is located in a shadow area 4 to provide an "intelligent" repeater that has the objective, for example, of reducing the traffic carried by the network (for example, by limiting transmission of messages in resoonse to only predefined events or by forwarding only some of the information contained in the various messages received, to alleviate defective reception of GPS signals from GPS satellites, or more generally to support specific functions that can be implemented locally in the shadow area without requiring modification of other network elements.

There is advantageously provision for resolving any conflict that may arise, as seen from the connection station, between the repeater 3 and the beacon 5 or as seen from the beacon between the connection station 1 and the repeater 3. Eliminating such conflicts involves integrating a conflict management protocol typically defined between the connection station 1 and the repeater 3. In one embodiment, for example, on receiving a message having a sufficient receive quality level and carrying an as yet unidentified beacon address, the repeater could switch the beacon in question to a particular code, spectral or temporal resource by remote control. This resource is defined in the system and by convention is not used in the connection stations or the other beacons in the shadow area concerned.

Referring to FIG. 2, a repeater 3 of the invention includes a first converter unit 30 operating in accordance with the radio standard and the protocol of the connection station 1, or first station, a control unit 31 and a second converter unit 32 operating under the radio standard of the repeater satellite 2 and the protocol of the beacon 5, or second station. The repeater 3 is adapted to relay data communications between the connection station 1, or first station, and the beacon 5, or second station, when data communication between these two stations via the radiocommunication network alone is not possible.

The first converter unit 30 includes a duplexer 300, a receive subsystem including in cascade a receive circuit 301, a demodulator and decoder circuit 303 and a receive frame controller circuit 305, a transmit subsystem including in cascade a transmit frame controller circuit 306, a coder and modulator circuit 304 and a transmit circuit 302. The duplexer 300 is connected to the antenna 3a transmitting to and receiving from the connection station 1, to an output of the transmit circuit 302 and to an input of the receive circuit 301. The control unit 31 includes a protocol and transaction controller circuit 310, a request controller circuit 311, an application controller circuit 312 and a location controller circuit 313. The second converter unit 32 includes a duplexer 329, a transmit subsystem including a packet controller circuit 321, a frame controller circuit 323, a coder and modulator circuit 325 and a transmit circuit 327, and a receive subsystem including a receive circuit 326, a decoder and demodulator circuit 324, a frame controller circuit 322 and a packet controller circuit 320. The duplexer 329 is connected to the antenna 3b transmitting to and receiving from the shadow area 4, to an output of the transmit circuit 327 and to an input of the receive circuit 326.

The first converter unit 30 converts a first radio signal received from the connection station 1 into the form of first receive messages and converts first transmit messages into the form of a first radio signal transmitted to the connection station 1.

The second converter unit 32 converts a second radio signal received from each beacon in the shadow area 4 into the form of second receive messages and converts second transmit messages into the form of a second radio signal transmitted to the beacon 5 concerned.

The first receive and transmit messages and the second receive and transmit messages are produced, processed or more generally managed by a given application in the application controller circuit 312 in the control unit 31. Accordingly, the repeater 3 is not merely an amplifier unit but incorporates real processing capacity by virtue of the control unit 31.

After it enters a shadow area 4, the beacon transmits a message in the form of a radio signal. The protocol for managing conflicts between the repeater 3 and the connection station 1 avoids all risk of conflict between the repeater 3 and the beacon 5 if the latter is near the repeater 3 without being totally inaccessible via the network.

The beacon 5 in the area 4 produces messages including, for example, information on the address of the beacon 5, time information, geographical location information and detected event information, and transmits these messages to the repeater 3 in the form of a second radio signal. This second radio signal is received by the antenna 3b and is converted by the receive subsystem 326-324-322-320 in the converter unit 32 into the form of output messages MES. With the aim of economizing on system capacity, not all the messages output in this way are transmitted to the connection station 1, instead being "filtered" by the application controller circuit 312 so that only essential messages are transmitted to said connection station 1, such as messages in which the detected event information is important. The same application controller circuit can produce, in response to receiving an output message MES, a respective acknowledgement message that is converted by the transmit subsystem 321-323-325-327 in the second converter unit 2 into the form of a radio signal transmitted to the beacon 5 concerned. This acknowledgement message tells the beacon 5 that the message it transmitted has been received correctly.

Thus the control unit 31 in the repeater 3 simulates the connection station 1 vis à vis the beacon 5. It will be shown later how the same control unit 31 in the base station can simulate the beacon 5 vis à vis the connection station 1. The control unit 31 can integrate an application function only in relation to beacons 5 in the shadow area 4, behaving in relation to the connection station 1 as a "mere" repeater, or, conversely, the control unit 31 can integrate an application function only in relation to the connection station 1, behaving in relation to the beacons 5 as a "mere" repeater.

In practise, there may also be provision for the application controller circuit 312 to store in memory address or identification information included in the output messages MES for addressing or interrogating the beacon 5 independently of the connection station 1, in accordance with a predefined procedure. In this case, the control unit 31 produces an interrogation message that is converted by the transmit subsystem 321-323-325-327 into the form of a radio signal transmitted to the beacon 5. The latter then sends back a response radio message that is received by the repeater 3 and converted by the receive subsystem 326-324-322-321 into an output response message.

In the case of selecting certain response messages for forwarding to the connection station 1 from all the response messages received, there may be provision for forwarding certain response messages some time after they are received. In this case, these messages are stored in memory and reproduced subsequently for transmission to the connection station 1 in the form of a radio signal via the transmit subsystem 306-304-302. As these messages can be transmitted off-line from the repeater to the connection station 1, the geographical location of the beacon 5 may have changed. Also, the system for locating the beacon using the GPS system may be inoperative because of the shadow area. To solve these problems, there is provision for partial modification of the content of the selected messages prior to transmission, in particular for modifying the location information and the time information. To this end, before off-line transmission of a message, the application controller circuit 312 solicits the location controller circuit 313, one input of which is connected to one output of the receive circuit 301. The receive circuit 301 typically receives three location signals transmitted by GPS satellites that enable the location controller circuit 313 to determine the position of the repeater, deemed to be the position of the beacon 5. This information on the location of the beacon is then transmitted to the application controller circuit 312 which consequently modifies the content of the message to be transmitted. The time information stored in memory of the message to be transmitted to the connection station 1 is added by the application controller circuit 312. The application controller circuit accordingly modifies the content of the output messages to transmit them to the connection station 1.

In one advantageous embodiment the fact that, in a satellite network, the satellite(s) of the system, or network, do not provide total coverage can also be allowed for. In this case, the application controller circuit 312 can store in memory a geographical map of the coverages of the satellites at all times in accordance with their position, their respective coverages, etc. In this case, the control unit 31 can delay transmission to the connection station 1 via the transmit subsystem 306-304-302 of messages received from a given beacon via the transmit subsystem 326-324-322-32, in particular in accordance with the orbital position of the satellite, so that on transmission of a message received in the form of a radio signal a satellite is actually present to receive the transmitted signal and to relay it to the connection station 1.

Although the invention is described hereinabove for a particular embodiment, the skilled person will understand that its implementation can be extended to any repeater adapted to cover a shadow area that includes application controller means to manage messages in accordance with a given application. The term "application" is used herein with the meaning it has in the OSI recommendations of the ISO.

There is claimed:

1. A repeater for use in a radiocommunication network for relaying data communications between first and second stations between which data communication via said radiocommunication network alone is impossible, said repeater including:

first converter means for converting a first radio signal received from said first station into the form of first receive messages and converting first transmit messages into the form of a first radio signal transmitted to a first station, second converter means for converting a second radio signal received from said second station into the form of second receive message and converting second transmit messages into the form of a second radio signal transmitted to said second station, and application controller means for managing said first receive messages, said first transmit messages, said second receive messages and said second transmit messages, wherein said application controller means simulate said first station, respectively for said second station, vis à vis said second station respectively for said first station such that traffic on said radiocommunication network is reduced.

2. The repeater claimed in claim 1 wherein said application controller means include means for storing in memory identification data received from at least one of said first and second stations for addressing said first station, respectively said second station.

3. The repeater claimed in claim 1 wherein said application controller means include means for producing an interrogation message that is converted by said second converter means into the form of said second radio signal transmitted to said second station.

4. The repeater claimed in claim 3 wherein said application controller means include means for selecting certain second response messages from second response messages received from said second converter means in response to the transmission in the form of said second radio signal of respective interrogation messages and means for producing said certain selected second response messages in first messages transmitted in the form of said first radio signal to said first station.

5. The repeater claimed in claim 1 wherein said application controller means include means for producing acknowledgement messages that are converted by said first converter means into the form of said first radio signal transmitted to said first station.

6. The repeater claimed in claim 1 wherein said radiocommunication network is a satellite network and said application controller means include means for delaying the transmission to said first station via said first converter means of messages received from said second station via said second converter means in accordance with an orbital position of a satellite.

* * * * *